(12) United States Patent
Tamura

(10) Patent No.: US 7,201,482 B2
(45) Date of Patent: Apr. 10, 2007

(54) PROJECTION TYPE DISPLAY DEVICE

(75) Inventor: Youichi Tamura, Tokyo (JP)

(73) Assignee: NEC Viewtechnology, Ltd. (JP)

( * ) Notice: Subject to any disclaimer, the term of this patent is extended or adjusted under 35 U.S.C. 154(b) by 253 days.

(21) Appl. No.: 10/922,928

(22) Filed: Aug. 23, 2004

(65) Prior Publication Data

US 2005/0052620 A1   Mar. 10, 2005

(30) Foreign Application Priority Data

Sep. 10, 2003   (JP)   ............................. 2003-318285

(51) Int. Cl.
G03B 21/14   (2006.01)
H04N 3/23   (2006.01)
G09G 5/00   (2006.01)

(52) U.S. Cl. .................. 353/70; 348/746; 348/747; 345/647

(58) Field of Classification Search .............. 353/70, 353/69, 101; 348/739, 744–747; 349/7, 349/8; 345/647

See application file for complete search history.

(56) References Cited

U.S. PATENT DOCUMENTS

2003/0035590 A1*   2/2003   Takeuchi et al. ............ 382/254

FOREIGN PATENT DOCUMENTS

| JP | 2002-284363 | 10/2000 |
| JP | 2002-044571 | 2/2002 |
| JP | 2003-046908 | 2/2003 |
| JP | 2003-57752 | 2/2003 |
| JP | 2003-167296 | 6/2003 |
| JP | 2003-198993 | 7/2003 |
| JP | 2004-32484 | 1/2004 |

OTHER PUBLICATIONS

Translation of JP Patent No. 2003-57752.*
Japanese Office Action issued Apr. 25, 2006 w/translation of relevant portions.

* cited by examiner

Primary Examiner—W. B. Pekey
Assistant Examiner—Rochelle Blackman
(74) Attorney, Agent, or Firm—Dickstein, Shapiro, LLP.

(57) ABSTRACT

A projection type display device includes a distortion corrector for correcting a projected image for distortions when the image is projected with a projection optical axis tilted with respect to a screen. The distortion corrector comprises a tilt angle generator for finding a tilt angle of the projection optical axis, and a display image corrector for correcting the display image using the tilt angle. The display image corrector comprises a two-dimensional table for storing corrected coordinates for four vertexes of the display image employing a vertical tilt angle and a horizontal tilt angle as variables, and a fixed point determiner for selecting one of the four vertexes as a fixed point.

17 Claims, 8 Drawing Sheets

Fig. 1

Prior Art

Fig. 2A

Prior Art

Fig. 2B

Prior Art

| | | | | | | |
|---|---|---|---|---|---|---|
| | | | | | | |
| | ⋮ | ⋮ | ⋮ | ⋮ | ⋮ | ⋮ |
| 5 | $A_{10}$ | $A_{11}$ | $A_{12}$ | · · · · · | · · |
| 0 | $A_{00}$ | $A_{01}$ | $A_{02}$ | · · · · · | · · |
| | 0 | 5 | 10 | · · · · · | · · |

Vertical tilt angle (degree) / Horizontal tilt angle (degree) — 321

PROJECTION TYPE DISPLAY DEVICE

BACKGROUND OF THE INVENTION

1. Field of the Invention

The present invention relates to a projection type display device such as a liquid crystal projector, and more particularly, to a projection type display device which allows an user to readily correct an optical image for distortions which are produced when an optical image is enlarged and projected on a screen with a tilt angle in the vertical and horizontal directions through a projection lens.

2. Description of the Related Art

Conventionally, a projection type display device is typically placed below the center of a screen for projecting an enlarged image with a projection lens oriented upward. However, in this event, the image projected on the screen suffers from an inverse trapezoidal distortion (trapezoidal having an upper side longer than a lower side). In addition, when the projection type display device is placed at an angle in the horizontal direction (lateral direction) to the screen, the projected image further extends toward an upper left side or an upper right side to present a more complicated trapezoidal distortion.

Figure 1:
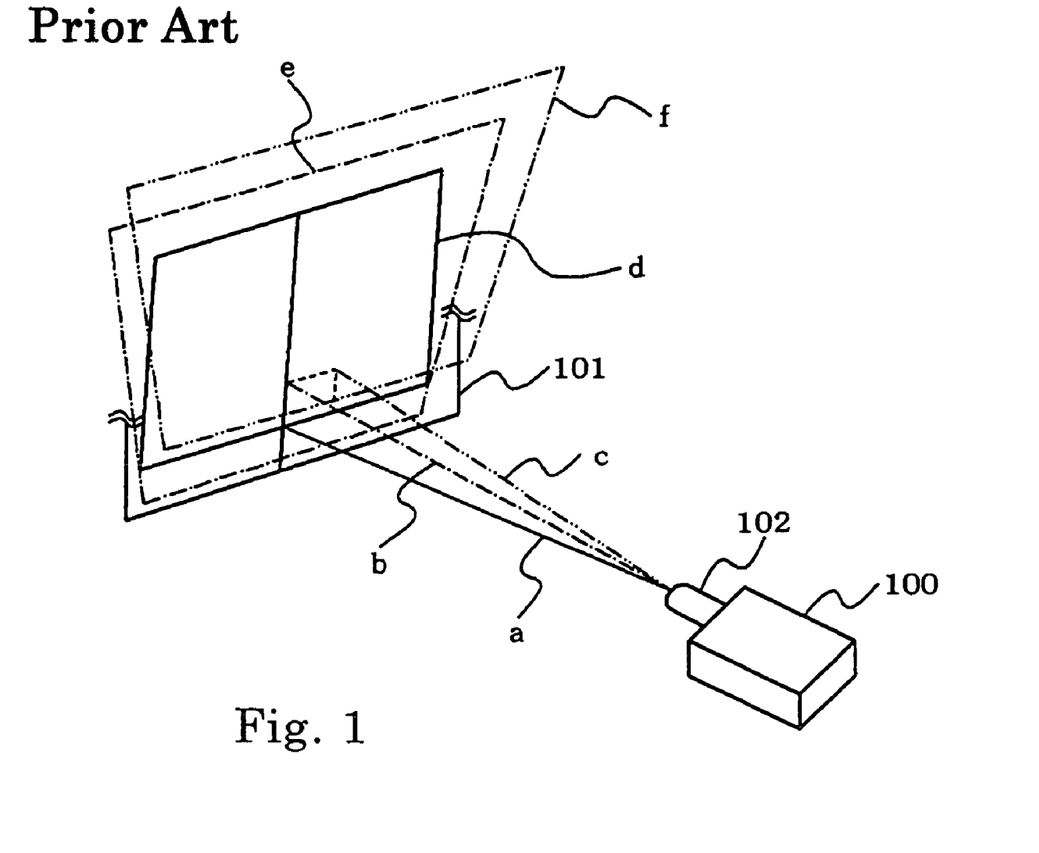
FIG. 1 is a diagram for describing the relationship between a placement of a conventional projection type display device and an image projected on a screen.

Now, FIG. 1 shows the relationship between the placement of the projection type display device and an image projected on the screen.

Referring to FIG. 1, the image projected on screen 101 reproduces original rectangular image d without tilt distortions when the image is projected from projection lens 102 of projection type display device 100 along projection optical axis a without tilt to screen 101. However, when the image is projected along optical axis b which is vertically tilted, display device 100 provides vertically tilted image e in an inverse trapezoidal shape. Moreover, when the image is projected along optical axis c which is horizontally tilted to the right, the resulting image further extends toward an upper right side to present horizontally and vertically tilted image f which has more complicated distortions.

To consider such a distortion, a correction for a trapezoidal distortion, which is produced when projection type display device 100 is positioned as shown in FIG. 1 (projection lens 102 is oriented upward and tilted to the right), will be described with reference to FIGS. 2A to 2C.

Figure 2A:
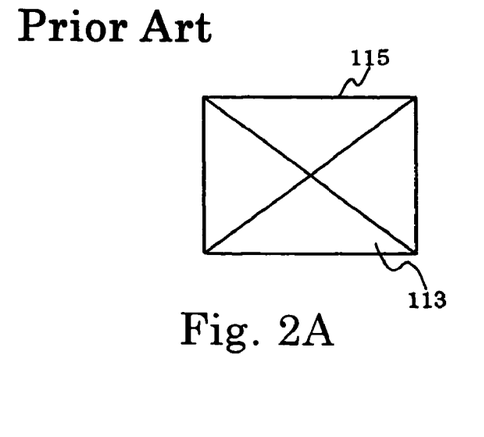
FIGS. 2A to 2C are diagrams for describing how a correction is made for a trapezoidal distortion in a conventional projection type display device.
Figure 2B:
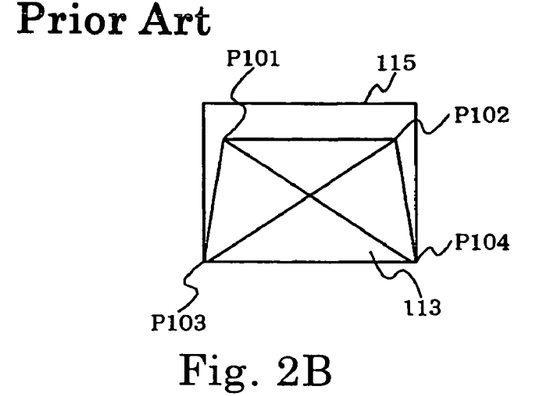
Figure 2C:
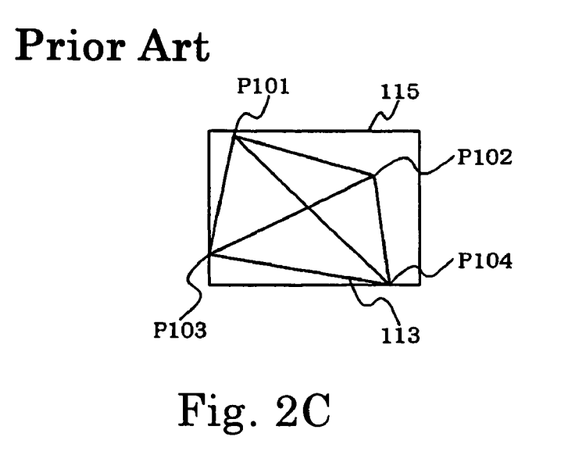

FIGS. 2A to 2C are diagrams for describing how an image is corrected for a trapezoidal distortion.

FIGS. 2A, 2B illustrate image 113 displayed within image display range 115 on an image display device (liquid crystal panel) when a vertical correction is made. Displayed image 113 on an image display device (not shown) is distorted in a direction opposite to an inverse trapezoidal distortion of the image 101 projected on the screen to correct the projected image for the distortion, resulting in a rectangle. Though not shown, the correction for a vertical distortion involves increasing a compression ratio of a line corresponding to the upper side of the projected image on the displayed image, on the image display device, and reducing the compression rate toward the lower side.

FIGS. 2B, 2C illustrate image 113 displayed on the image display device when it is subjected to a horizontal correction after the vertical correction.

In this example, a transition from FIG. 2A to FIG. 2B implies movements of upper left vertex P101 and upper right vertex P102, and a transition from FIG. 2B to FIG. 2C implies movements of lower left vertex P103 and lower right vertex P104, eventually resulting in movements of all four vertexes P101, P102, P103, P104.

When an user corrects an image for distortions, the user typically matches the vertexes of the image with the vertexes of screen 101 before the correction for the distortion, so that the vertexes of the image move each time a vertical correction or a horizontal correction is made as illustrated in FIG. 2A to 2C, resulting in difficulty in correction for the distortion.

Even if the projection type display device is equipped with an acceleration sensor for measuring a tilt angle in the vertical direction to automate the vertical correction, difficulties in the correction for distortion are not mitigated because all the four vertexes still move in the horizontal correction.

To solve this problem, Japanese Patent Laid-open Publication No. 198993/2003, for example, discloses a projection type display device which collectively corrects an image for distortion produced when the image is projected at tilt angles in two directions, i.e., for a trapezoidal distortion produced when the image is projected at an tilt angle in the vertical direction, and for a trapezoidal distortion when the image is projected at an tilt angle in the horizontal direction. This projection type display device comprises a tilt sensor for detecting a tilt angle in the vertical direction, and a rotary knob manipulated by the user to correct an image for distortions in the horizontal direction. The result detected by the tilt sensor is applied to a distortion correcting circuit through a microcomputer to automatically correct the image for distortions in the vertical direction. Together with this correction, a voltage which varies in accordance with rotating angles of the rotary knob, is applied to the microcomputer which converts the voltage to data related to a horizontal tilt angle set by the user, and the data is applied to the distortion correcting circuit. In this way, by rotating the rotary knob by an angle equivalent to the horizontal tilt angle of the projection type display device in the reverse direction, the image caused by the horizontally tilted projection is corrected for distortions in the horizontal direction, with an intuitive easy-to-understand adjustment.

In the foregoing projection type display device, a correction is made by rotating in the reverse direction the scaled rotary knob by an angle equal to an angle by which the display device is tilted in the horizontal direction. However, since the user must make corrections while watching both the scale on the rotary knob and the image projected on the screen, and each correction causes the vertexes to move, the correction of an image for distortions entails difficult manipulations, so that an user must attain proficiency in the manipulations.

SUMMARY OF THE INVENTION

It is an object of the present invention to provide a projection type display device which is capable of allowing the user to readily correct a projected optical image for distortions produced when the optical image is projected on a screen at tilt angles in the vertical and horizontal directions, by fixing one of four vertexes of the projected image.

According to one aspect of the present invention, a projection type display device includes an image display device for processing an input image and displaying the processed image, a projection lens for enlarging a display image of the image display device for display on a screen as a projected image, a distortion corrector for correcting the projected image for distortions when the display image is projected with a projection optical axis tilted with respect to the screen, an angle detector for detecting a tilt angle of the projection optical axis in the vertical direction, and a user interface having a controller for correcting the projected image for distortions in the horizontal direction. The distortion corrector includes a tilt angle generator for receiving outputs from the angle detector and the user interface to find the tilt angle of the projection optical axis of the projection lens with respect to the screen, and a display image corrector for correcting the display image using the tilt angle. The display image corrector includes a processor for finding four vertexes using a two-dimensional table having corrected coordinates for the four vertexes of the display image or a mathematical expression, wherein the two-dimensional table or the mathematical expression employ a vertical tilt angle and a horizontal tilt angle as variables and, and a fixed point determiner for selecting one of the four vertex as a fixed point.

With the foregoing configuration, when the image is corrected for distortions which are produced when the optical image is projected with tilt angles in the vertical and horizontal directions with respect to the screen, the projection type display device of the present invention selects one of vertexes of a quadrilateral represented by a projected optical image as a fixed point, and make the vortex immobile even if the image is corrected for distortions, thereby allowing an user to readily correct the image for distortions.

The distortion corrector includes an arrow image generator for generating an image of an arrow, and an arrow positioner for displaying the image of the arrow for the fixed point determined by an input signal from the fixed point determiner. The corrected image and an output from the arrow positioner are combined by an image combiner of a fixed point display to generate an output image which has the arrow superimposed on the corrected image, and the output image is projected on the screen through the projection lens.

With the foregoing configuration, since the arrow indicates the fixed point which is determined from the tilt of the projection optical axis with respect to the screen, whether it is right-up tilt, left-up tilt, left-down tilt, or right-down tilt, the user can recognize the fixed point by view and therefore can visually and readily make a correction for distortions.

The above and other objects, features and advantages of the present invention will become apparent from the following description with reference to the accompanying drawings which illustrate examples of the present invention.

DESCRIPTION OF THE PREFERRED EMBODIMENTS

Figure 3:
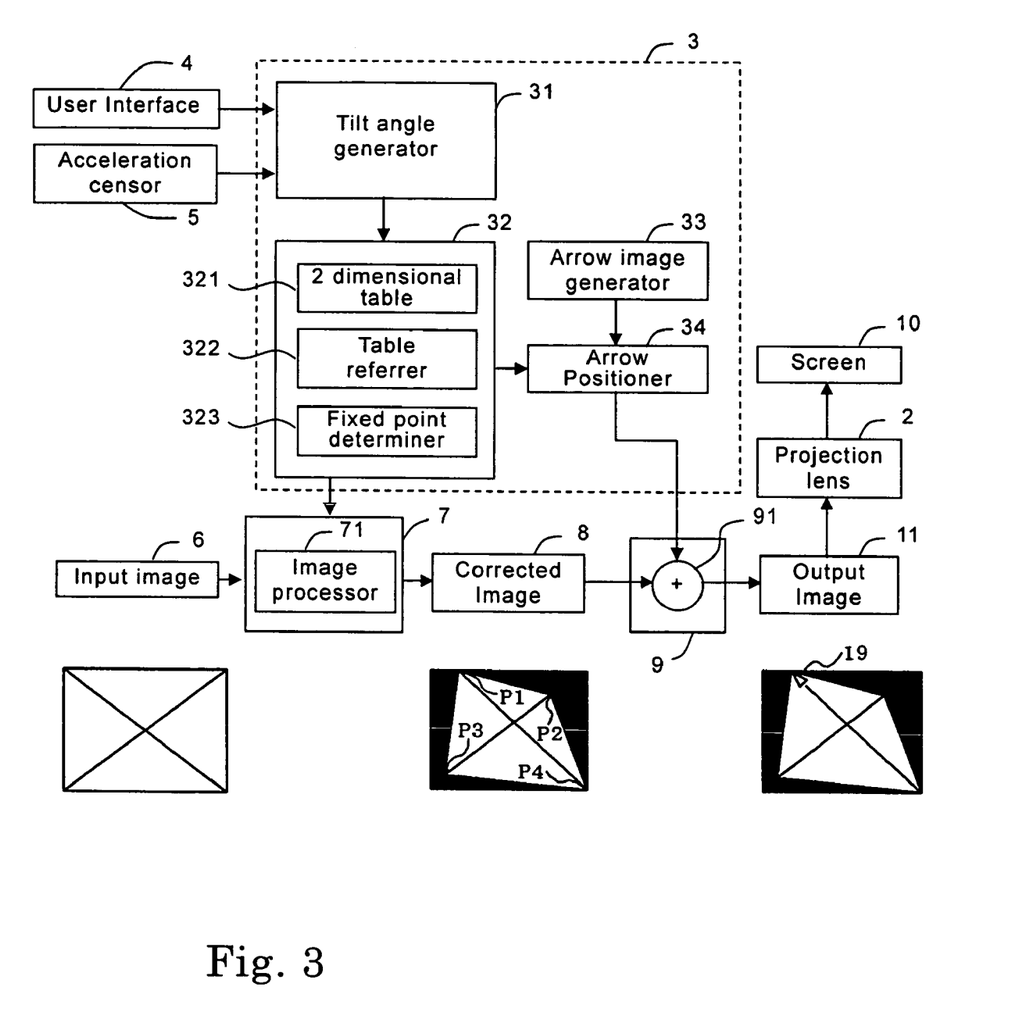
FIG. 3 is a block diagram generally illustrating the configuration of one embodiment of a projection type display device according to the present invention.
Figure 4:
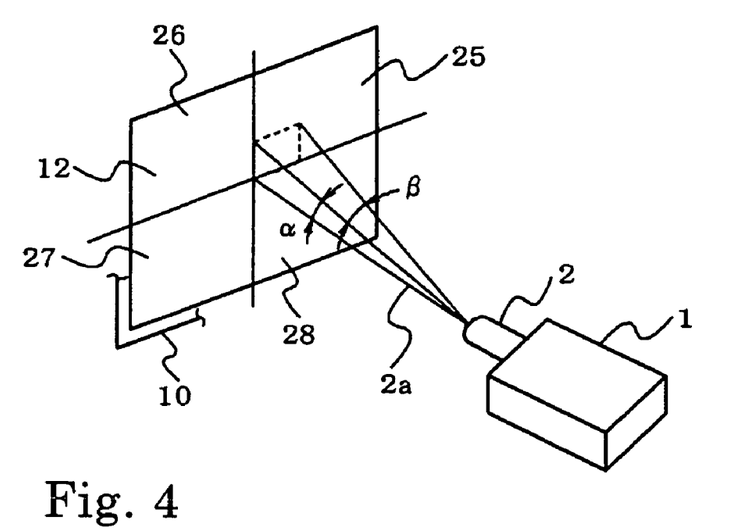
FIG. 4 is a diagram showing the relationship between a screen and a projection optical axis of the projection type display device.

FIG. 3 is a block diagram generally illustrating the configuration of a projection type display device according to the present invention, and FIG. 4 is a diagram showing the relationship between a screen and a projection optical axis of the projection type display device.

Referring to FIGS. 3 and 4, projection type display device 1 comprises image display device 7 for processing input image 6 and displaying the processed image; projection lens 2 for enlarging the display image produced by image display device 7 and displaying it on screen 10 as projected image 12; distortion corrector 3 for correcting projected image 12 for distortions which are produced when the display image is projected on screen 10 along an axis tilted to axis 2a; acceleration sensor 5 for detecting a tilt angle of projection optical axis in the vertical direction; and user interface 4 having a controller (not shown) for correcting an image for distortions in the horizontal direction. Distortion corrector 3 comprises tilt angle generator 31 for finding a tilt angle of projection optical axis of projection lens 2 with respect to screen 10 and receives outputs from acceleration sensor 5 and user interface 4; and display image corrector 32 for correcting display image 13 using the tilt angle. Display image corrector 32 comprises two-dimensional table 321 which employs a vertical tilt angle and a horizontal tilt angle as variables, and stores corrected coordinates for four vertexes of display image 13; table referrer 322 for obtaining corrected coordinates for four vertexes P1, P2, P3, P4 corresponding to the tilt angle input from tilt angle generator 31 by referring to two-dimensional table 321; and fixed point determiner 323 for selecting one of the four vertexes as fixed point 20. The description of a construction to find corrected coordinates for the four vertexes by calculations is omitted.

Distortion corrector 3 comprises arrow image generator 33 for generating an image of arrow 19; and arrow positioner 34 for displaying the image of arrow 19 generated by arrow image generator 33 for fixed point 20 determined by an output signal from fixed point determiner 323.

Though not shown, distortion corrector 3 has a CPU (Central Processing Unit), while display image corrector 32 is implemented by an LSI (Large Scale Integrated Circuit), such that the CPU controls coordinate correction processing of the LSI.

An output from display image corrector 32 and input image 6 are processed by image processor 71 (image processing LSI) of image display device 7 to generate and output corrected image 8. Corrected image 8 is combined with the output from arrow positioner 34 by image combiner 91 of fixed point display 9. Consequently, output image 11 having arrow 19 superimposed on corrected image 8 is projected on screen 10 through projection lens 2.

Figure 5:
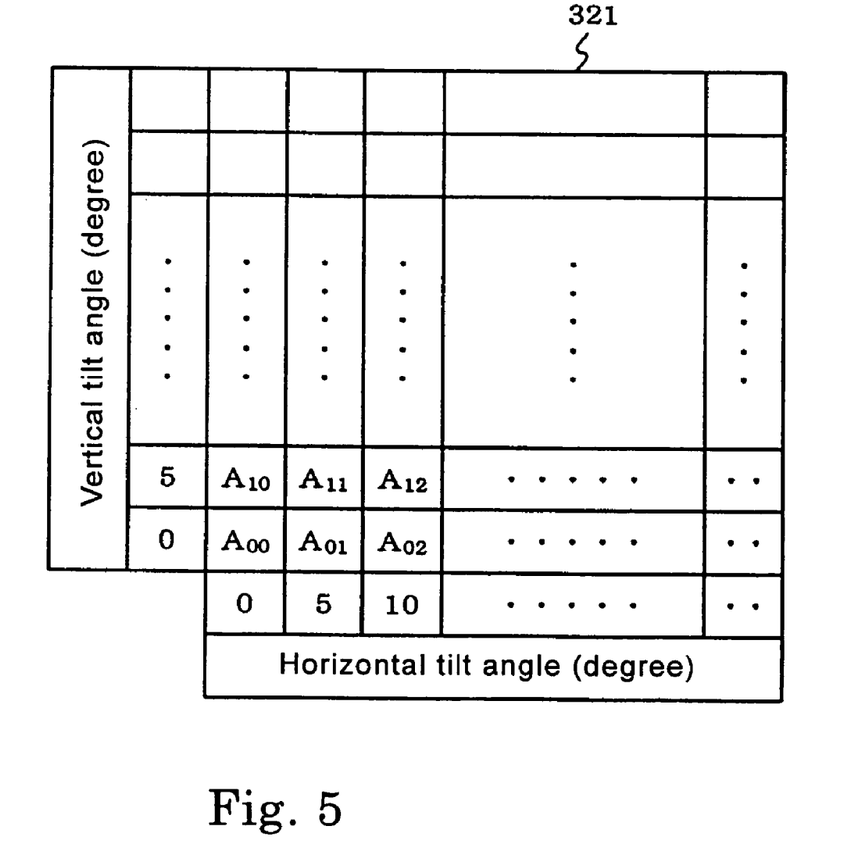
FIG. 5 is a diagram for describing a two-dimensional table.
Figure 6:
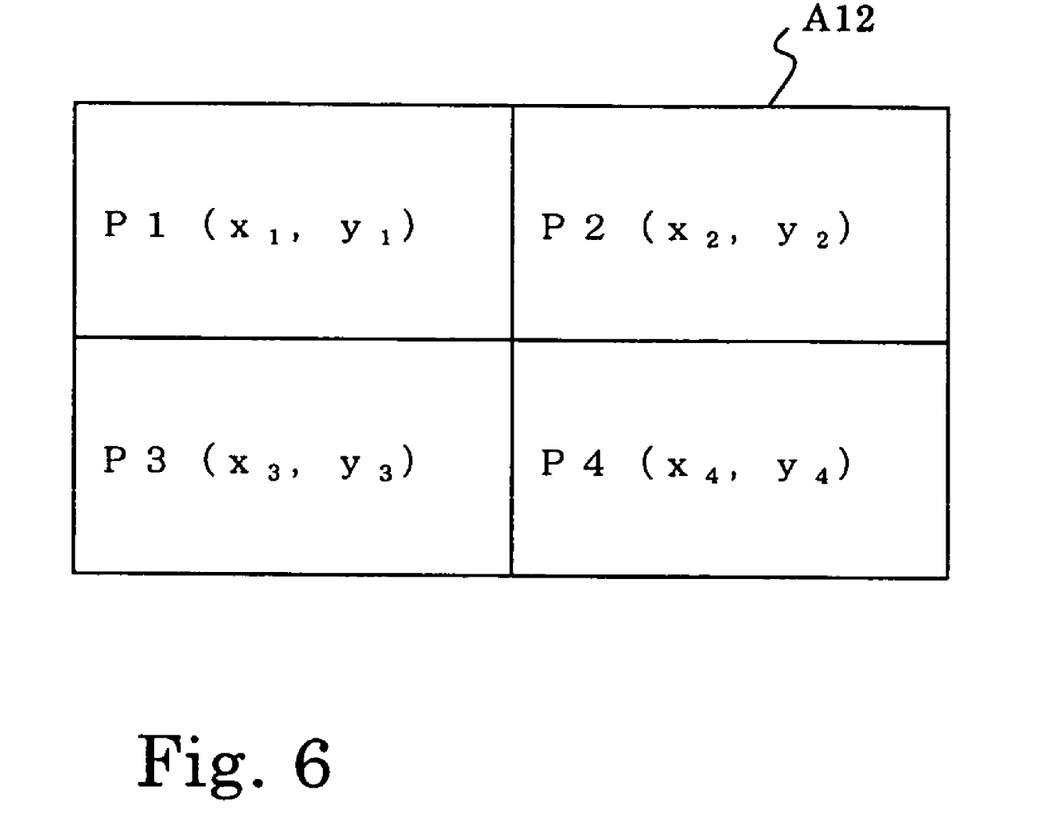
FIG. 6 is a diagram for describing a two-dimensional table.

Referring next to FIGS. 5, 6 for describing two-dimensional table 321, two-dimensional table 321 stores corrected coordinates for four vertexes P1, P2, P3, P4 of display image 13 in a matrix form with vertical tilt angles and horizontal tilt angles used as parameters.

For example, when projection type display device 1 is positioned five degrees (<=5) tilted in the vertical direction and ten degrees (β=10) tilted in the horizontal direction, table referrer 322 for obtaining corrected coordinates reads cell A12 in FIG. 5. As shown in FIG. 6, cell A12 stores two-dimensional corrected coordinates for the four vertexes: P1(x1,y1), P2(x2,y2), P3(x3,y3), P4(x4,y4) (specific coordinate values for x, y are omitted).

FIG. 5 shows, as an example, two-dimensional table 321 which corresponds to the state in which projection type display device 1 is tilted in an upper right direction as shown in FIG. 4 (projection optical axis in FIG. 4 falls onto first quadrant 25). FIG. 5 omits two-dimensional tables 321 corresponding to second quadrant 26, third quadrant 27, and fourth quadrant 28.

Alternatively, the variables (parameters), i.e., the vertical tilt angles and horizontal tilt angles may be indicated as an angular range, for example, from zero degree to five degrees, or from five degrees to ten degrees. The increments of angles in table 321, as a matter of course, may be set arbitrarily, not limited to five degrees.

Next, the operation of projection type display device 1, configured as described above, will be described with reference to FIGS. 7A to 8B.

Figure 7A:
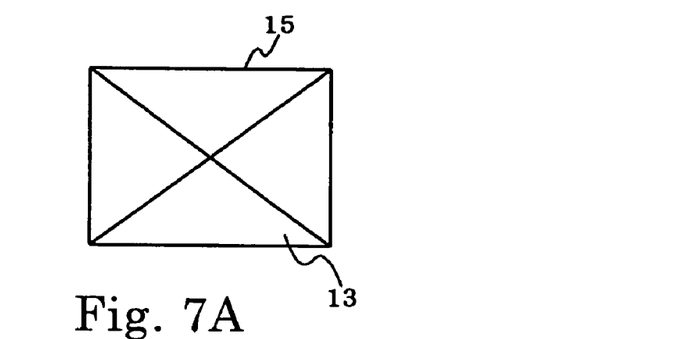
FIGS. 7A to 7C are diagrams for describing operations for correcting a displayed image when it is projected along a projection optical axis oriented in an obliquely upward right direction with respect to a screen.
Figure 7B:
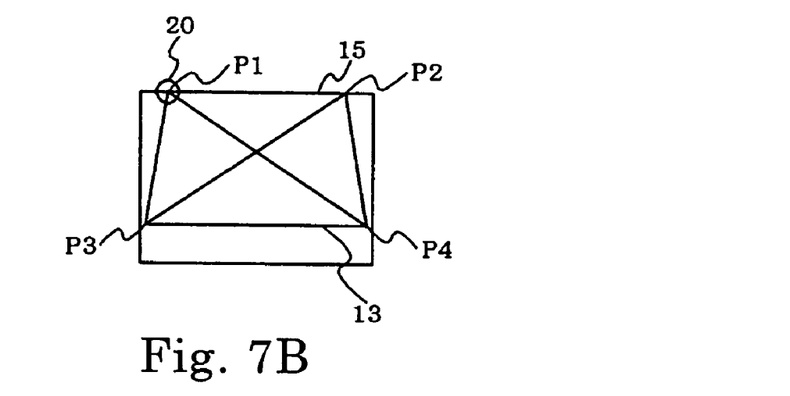
Figure 7C:
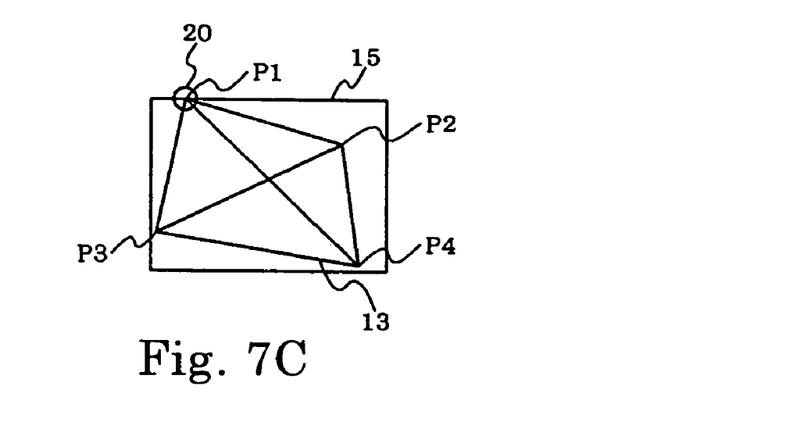
Figure 8A:
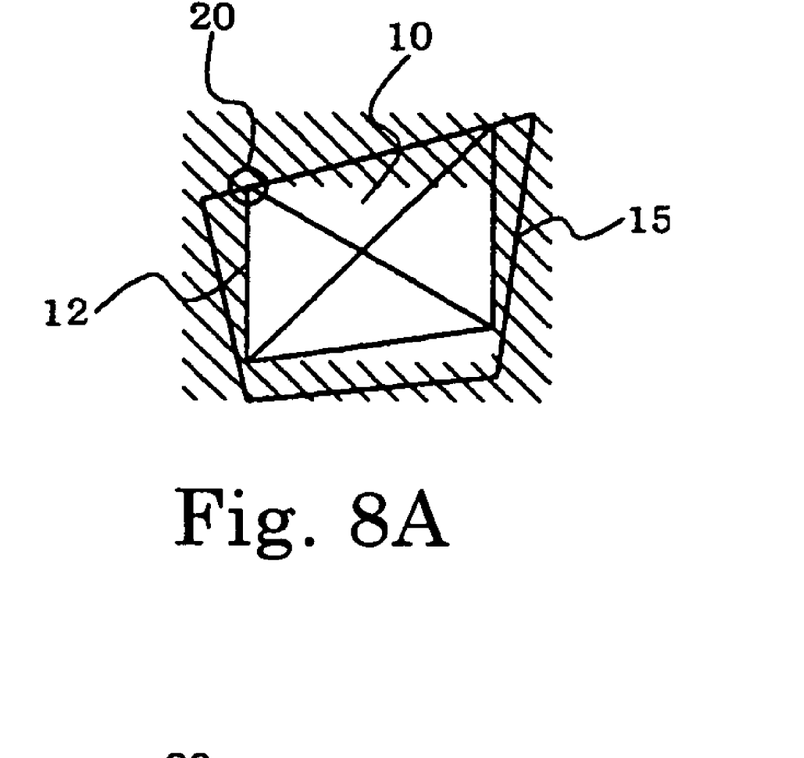
FIGS. 8A and 8B are diagrams for describing an image projected on a screen.
Figure 8B:
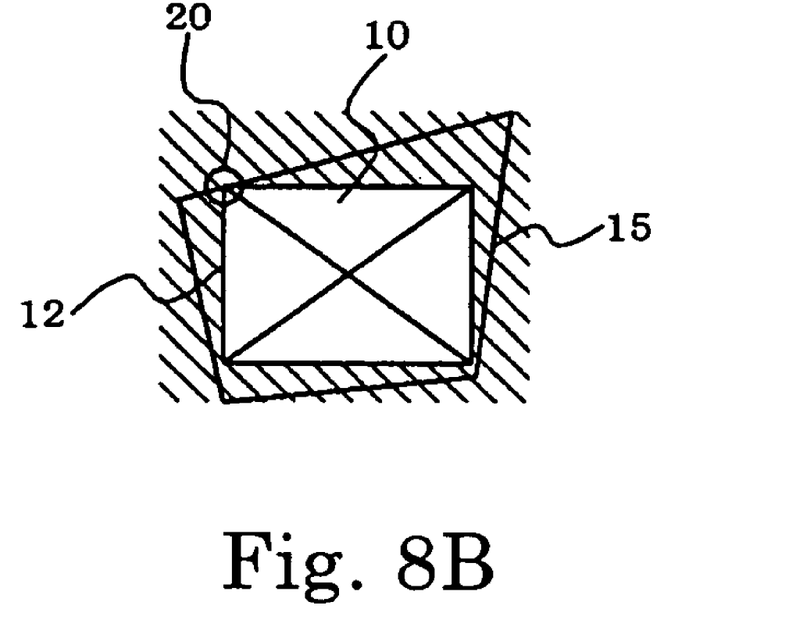

FIGS. 7A to 7C are diagrams for describing operations for correcting display image 13 when it is projected along a projection optical axis oriented in an obliquely upward right direction with respect to screen 10, and FIGS. 8A and 8B are diagrams each for describing image 12 on screen 10, corresponding to FIGS. 7B and 7C, respectively.

For convenience, the following description is based on the assumption that projection type display device 1 is positioned five angles (<=5) tilted in the vertical direction and ten degrees (β=10) tilted in the horizontal direction, as illustrated in FIG. 4.

Referring to FIGS. 7A to 8B, FIG. 7A shows that display image 13 is not corrected within image display range 15, and FIG. 7B shows that display image 13 is corrected in the vertical direction. Tilt angle generator 31 generates a vertical tilt angle based on the output of accelerator sensor 5. Table referrer 323 reads two-dimensional table 321 of display image corrector 32 to obtain corrected coordinates corresponding to the vertical tilt angle (A10 in FIG. 5 is obtained. Corrected coordinates are omitted in the figure) to automatically correct display image 13 in the vertical direction.

Even if an user attempts to match an arbitrary vertex of vertically corrected projected image 12 with the corresponding vertex of screen 10, movements of the respective vertexes from FIGS. 7A to 7B do not increase difficulties in the distortion correction because the vertical correction is automatically made.

In this event, projected image 12 on screen 10 is seen as illustrated in FIG. 8A.

After the automatic correction for distortions in the vertical direction, the user manipulates the controller (not shown) of user interface 4 to correct projected image 12 for distortions due to the tilt angle in the horizontal direction. In a correction from the state shown in FIG. 7B to that shown in FIG. 7C, the horizontal tilt angle is detected by a rotary encoder (not shown) or the like provided in user interface 4, and a horizontal tilt angle is generated by tilt angle generator 31 using the horizontal tilt angle. Then, table referrer 322 reads two-dimensional table 321 of display image corrector 32 to obtain corrected coordinates corresponding to the horizontal tilt angle (A12 in FIG. 5 is obtained) to correct display image 13 for distortions in the horizontal direction.

The corrected coordinates for the four vertexes obtained in this event are P1(x1,y1), P2(x2,y2), P3(x3,y3), P4(x4,y4).

Here, fixed point determiner 323 selects one of four vertexes P1–P4 as fixed point 20. Specifically, upper left vertex P1 is selected as fixed point 20 when an image is projected along a projection optical axis oriented in an obliquely upward right direction with respect to screen 10; upper right vertex P2 is selected when axis is tilted in an obliquely upward left direction; lower right vertex P4 is selected when projection optical axis is tilted in an obliquely downward left direction; and lower left vertex P3 is selected when axis is tilted in an obliquely downward right direction (see FIG. 9).

Figure 9:
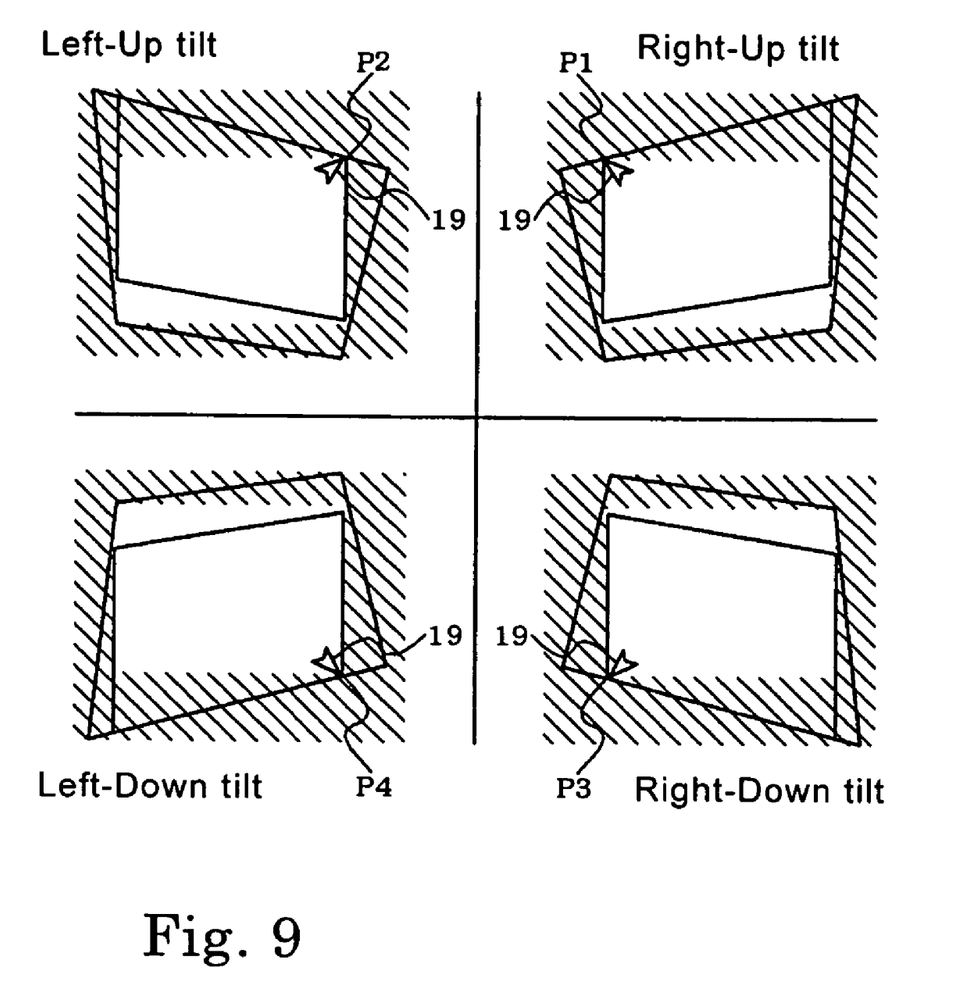
FIG. 9 is a diagram showing the relation between arrow displayed position and the projection optical axis with respect to the screen.

Fixed point determiner 323 is arranged in advance to select upper left vertex P1 as fixed point 20 when two-dimensional table 321 from which the corrected coordinates are obtained corresponds to first quadrant 25; upper right vertex P2 when table 321 corresponds to second quadrant 26; lower right vertex P4 when table 321 corresponds to third quadrant 27; and lower left vertex P3 when table 321 corresponds to fourth quadrant 28.

In correcting projected image 12 which is projected in an upper right direction, upper left vertex P1 is selected as fixed point 20 and is therefore made immobile. Thus, when the user matches upper left fixed point 20 with the corresponding vertex of screen 10, as illustrated in FIG. 8A, to correct projected image 12 in the horizontal direction, then projected image 12 is corrected as shown in FIG. 8B. In this way, the user can quite readily make a correction for distortions in the horizontal direction.

Referring to FIG. 9, arrow 19 is displayed to point to fixed point 20 in order for the user to visually recognize fixed point 20. Since fixed point 20 is determined corresponding to the tilt of projection optical axis of projection type display device 1 with respect to screen 10, whether it is right-up tilt, left-up tilt, left-down tilt, or right-down tilt, arrow 19 displayed for indicating fixed point 20 allows the user to more readily and visually make a correction for distortions in the horizontal direction.

Although a certain preferred embodiment of the present invention has been shown and described in detail, it should be understood that various changes and modifications may be made without departing from the spirit or scope of the appended claims.

What is claimed is:

1. A projection type display device comprising:
   an image display device for processing an input image and displaying a processed image;
   a projection lens for enlarging a display image of said image display device for display on a screen as a projected image;
   a distortion corrector for correcting the projected image for distortions when said display image is projected with a projection optical axis tilted with respect to said screen;
   an angle detector for detecting a tilt angle of said projection optical axis in a vertical direction; and
   a user interface having a controller for correcting the projected image for distortions in a horizontal direction,
   wherein said distortion corrector includes a tilt angle generator for receiving outputs from said angle detector and said user interface to find the tilt angle of the projection optical axis of said projection lens with respect to said screen, and a display image corrector for correcting the display image using the tilt angle, and
   said display image corrector includes a processor for finding four vertexes using a two-dimensional table having corrected coordinates for the four vertexes of the display image or a mathematical expression, said two dimensional table or said mathematical expression employing a vertical tilt angle and a horizontal tilt angle as variables, and a fixed point determiner for selecting one of the four vertex as a fixed point.

2. The projection type display device according to claim 1, wherein:
said fixed point is determined such that a coordinate of said vertex does not move in response to a correction for distortions in the horizontal direction.

3. The projection type display device according to claim 1, wherein:
said distortion corrector includes an arrow image generator for generating an image of an arrow, and an arrow positioner for displaying the image of the arrow for the fixed point determined by an output signal from said fixed point determiner.

4. The projection type display device according to claim 3, wherein:
said image display device includes an image processor for processing an output from said display image corrector and the input image to generate a corrected image, and delivering the corrected image.

5. The projection type display device according to claim 4, further comprising:
a fixed point display for combining said corrected image with an output from said arrow positioner by an image combiner to generate an output image which has the arrow superimposed on the corrected image, and projecting said output image on said screen through said projection lens.

6. The projection type display device according to claim 1, wherein:
said fixed point determiner selects an upper left vertex as the fixed point when the projection optical axis is tilted in an upper right direction with respect to said screen; an upper right vertex when the axis is tilted in an upper left direction; a lower right vertex when the axis is tilted in a lower left direction; and a lower left vertex when the axis is tilted in a lower right direction.

7. The projection type display device according to claim 1, wherein said angle detector includes an acceleration sensor.

8. The projection type display device according to claim 1, wherein said user interface includes means for detecting a horizontal tilt angle, and means for manually correcting a distortion due to a horizontal tilt angle.

9. The projection display device according to claim 1, wherein said two-dimensional table stores the corrected coordinates for four vertexes of the display image in a matrix form.

10. A projection type display device for projecting an image that is displayed on an image display device onto a screen, characterized in that
the projection type display device has a vertical angle detector for detecting an angle of a projection optical axis in a vertical direction with respect to the screen, and a horizontal angle detector for detecting an angle of the projection optical axis in a horizontal direction with respect to the screen; and
a quadrilateral image is displayed on the image display device, the quadrilateral image being determined from outputs of the vertical angle detector and the horizontal angle detector based on a predetermined relationship; wherein one of four vertexes of the quadrilateral image, the vertex being selected depending on a tilt direction of the projection optical axis with respect to the screen, is a fixed point on the image display device, irrespective of a variation in the output of the vertical angle detector and/or the horizontal angle detector.

11. The projection type display device according to claim 10, wherein the vertical angle detector includes an acceleration sensor.

12. The projection type display device according to claim 10, wherein the horizontal angle detector includes a user interface having a controller.

13. The projection type display device according to claim 10, wherein the fixed point is immobile on the image display device, irrespective of the variation in the output of the horizontal angle detector.

14. The projection type display device according to claim 10, wherein an image of an arrow is displayed in the image in order to indicate the fixed point.

15. The projection type display device according to claim 10, wherein a lower right vertex is selected as the fixed point when the projection optical axis is tilted in a lower left direction with respect to the screen, and a lower left vertex is selected when the axis is tilted in a lower right direction.

16. The projection type display device according to claim 10, wherein an upper left vertex is selected as the fixed point when the projection optical axis is tilted in an upper right direction with respect to the screen, and an upper right vertex is selected when the axis is tilted in an upper left direction.

17. The projection type display device according to claim 10, wherein the predetermined relationship is stored in a table.

* * * * *